US012584609B2

(12) United States Patent
Frankiewicz et al.

(10) Patent No.: US 12,584,609 B2
(45) Date of Patent: Mar. 24, 2026

(54) ARRAYED OPTICS AND LIGHT FIXTURES INCLUDING THE SAME

(71) Applicant: ABL IP Holding LLC, Atlanta, GA (US)

(72) Inventors: Gregory Frankiewicz, Elmhurst, IL (US); Jonathan Ferry, Chicago, IL (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 18/821,298

(22) Filed: Aug. 30, 2024

(65) Prior Publication Data

US 2026/0063271 A1 Mar. 5, 2026

(51) Int. Cl.

*F21V 5/04* (2006.01)
*F21V 7/00* (2006.01)
*F21Y 113/13* (2016.01)
*F21Y 115/10* (2016.01)

(52) U.S. Cl.

CPC ............ *F21V 5/045* (2013.01); *F21V 7/0066* (2013.01); *F21Y 2113/13* (2016.08); *F21Y 2115/10* (2016.08)

(58) Field of Classification Search

CPC ............................... F21V 5/045; F21V 7/0066
USPC .................................................... 362/311.02
See application file for complete search history.

(56) References Cited

U.S. PATENT DOCUMENTS

| | | | | |
|---|---|---|---|---|
| 8,152,320 | B2 * | 4/2012 | Goto | G02B 3/06 362/97.3 |
| 8,246,216 | B2 * | 8/2012 | Jiang | G02B 19/0028 362/310 |
| 8,845,142 | B2 * | 9/2014 | de Lamberterie | G02B 19/0028 362/311.01 |
| 10,309,613 | B2 * | 6/2019 | Adams | A01G 7/045 |
| 10,317,583 | B2 * | 6/2019 | Purchase | F21V 5/02 |
| 11,131,883 | B2 * | 9/2021 | Mukumoto | G02F 1/133605 |
| 2009/0122229 | A1 * | 5/2009 | Kim | G02B 6/0038 349/65 |
| 2010/0226127 | A1 * | 9/2010 | Bigliatti | F21V 5/002 362/327 |
| 2013/0258634 | A1 * | 10/2013 | Xu | F21V 9/14 362/19 |

* cited by examiner

*Primary Examiner* — Bryon T Gyllstrom
(74) *Attorney, Agent, or Firm* — Kilpatrick Townsend & Stockton LLP

(57) ABSTRACT

A lens for a light fixture has a plurality of protrusions for spreading a beam of light from a light source of the light fixture. The protrusions enable the lens to be used in different light fixtures while providing similar beam characteristics. In some configurations, the lens comprises texturing to further shape the beam.

20 Claims, 17 Drawing Sheets

ARRAYED OPTICS AND LIGHT FIXTURES INCLUDING THE SAME

BACKGROUND

A light fixture is an electronic device used to emit light and is sometimes referred to as a light fitting or luminaire. A light fixture can provide illumination inside a building, such as in a room of a house or business, or outside, such as to illuminate a tree or sidewalk. A light fixture can be battery powered, plugged into an electrical socket, or hardwired to an electrical source, such as a recessed can or a ceiling light hard wired in connection with a main electrical service panel of a building.

A light fixture comprises a lamp, sometimes referred to as a bulb, configured to generate light. The lamp can comprise one or more light sources, such as multiple light-emitting diodes (LEDs) to generate light from an applied electrical current.

The light fixture can have features, such as a reflector for directing light, a housing, an aperture, and/or a lens. The housing can be used for aligning the lamp and/or for protecting the lamp. Special-purpose light fixtures are used for a wide variety of purposes from automobile lighting to medical lighting.

SUMMARY

In some configurations, a system for a light fixture comprises a reflector arranged to reflect a portion of light from a plurality of light sources to a lens and/or the lens. The lens comprises an optical surface and a plurality of protrusions extending from the optical surface of the lens. The plurality of protrusions are each defined by a base and an apex. The apex is rounded. At least a portion of a wall of the protrusion, between the base and the apex, is straight. The portion of the wall that is straight is arranged to receive light from at least a subset of the plurality of light sources. In some embodiments, the plurality of protrusions are cones, and the portion of the wall of the protrusion that is straight is a slant of the cone; each cone has a half angle equal to or greater than 30 degrees and/or equal to or less than 87 degrees; the half angle of the plurality of protrusions varies as a function of distance from a center of the lens; the function of distance from the center of the lens is a step function; the function of distance from the center of the lens varies smoothly; the protrusions, of the plurality of protrusions, have a center-to-center spacing in one dimension equal to or greater than 0.5 mm and equal to or less than 2 mm; the reflector has a height so that a minimum distance between the plurality of light sources and the lens is equal to or greater than 20 mm; the optical surface is a first optical surface; the lens comprises a second optical surface opposite the first optical surface; the lens comprises texturing on the second optical surface; the first optical surface is arranged to be closer to the plurality of light sources than the second optical surface; the second optical surface is arranged to be closer to the plurality of light sources than the first optical surface; the system comprises a film element arranged next to the lens to diffuse light from the lens; the plurality of light sources includes two or more different colors of light sources; a length of the base of a protrusion is equal to or less than a center-to-center spacing of the base of a protrusion touches the base of neighboring protrusion; a length of the base of a protrusion is equal to or greater than a center-to-center spacing of the protrusions so that there is overlap between protrusions; and/or the length of the base of the protrusion is equal to or greater than the center-to-center spacing of the protrusions so that there is no flat region between protrusions.

In some configurations, a method comprises generating light from a plurality of light sources; transmitting light from the plurality of light sources towards a lens, wherein at least a portion of light from the plurality of light sources is reflected by a reflector to direct light towards the lens; and/or transmitting light through the lens. The lens comprises a plurality of protrusions extending from an optical surface of the lens, the plurality of protrusions each defined by a base and an apex. The apex is rounded. At least a portion of a wall of the protrusion, between the base and the apex, is straight. The portion of the wall that is straight is arranged to receive light from at least a subset of the plurality of light sources. In some embodiments, the plurality of protrusions are cones, and the portion of the wall of the protrusion that is straight is a slant of the conc.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

The present disclosure generally relates to lighting. More specifically, and without limitation, the present disclosure relates to a lens for use with different light sources and in different light fixtures, wherein the beam remains relatively unchanged. Many lighting systems are designed with a unique lens for a specific purpose. For example, one lens design is used for one type of light fixture. Improved illumination systems, apparatuses, and/or methods are desired. For example, it is desirable, in some situations, to have one lens design that can be used in multiple different light fixtures and still produce similar beam shaping. Having one lens design that can be used in multiple different light fixtures can simplify logistics and a number of parts used for an indoor lighting project. In some configurations, a lens design that can be used in a number of different light fixtures comprises an array of protrusions used to mix light to create flat illumination for a desired spacing criterion.

This disclosure relates to commonly owned U.S. patent application Ser. No. 18/606,680, filed Mar. 15, 2024, and U.S. patent application Ser. No. 18/820,898, filed on Aug. 30, 2024, the disclosures of which are incorporated by reference for all purposes.

Figure 1:
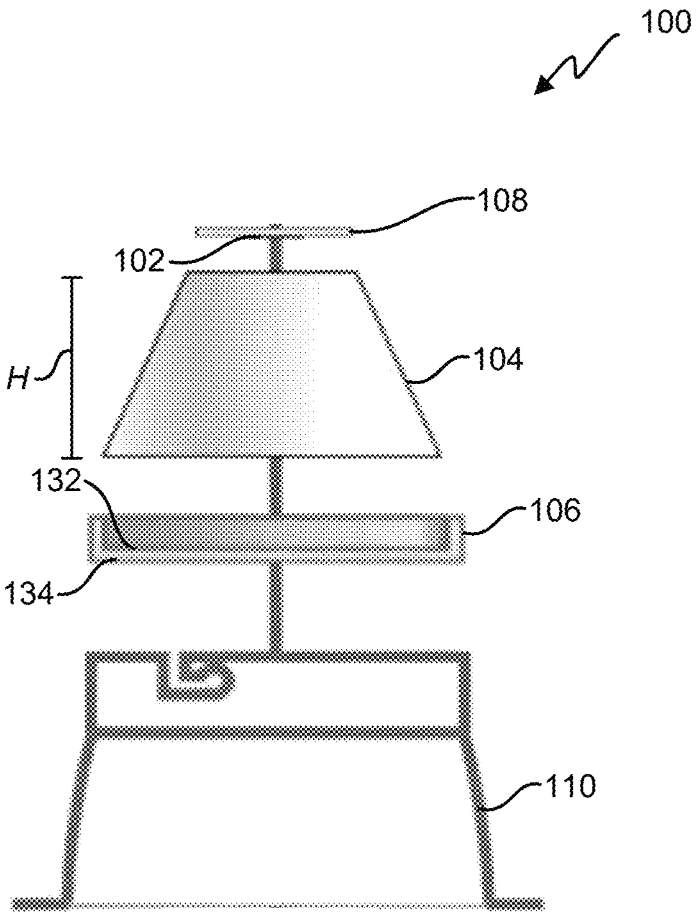
FIG. 1 illustrates an embodiment of a light fixture.

FIG. 1 illustrates an exploded view of an embodiment of a light fixture 100. The light fixture 100 can be recessed or flush mounted (e.g., in a ceiling). The light fixture 100 comprises one or more light sources 102 (e.g., a multi-LED lamp), a reflector 104, an optic 106, and a mount 108. The one or more light sources 102 are disposed within the reflector 104 between the mount 108 and the optic 106. The reflector 104 and mount 108 can be considered part of a housing of the light fixture 100.

The light fixture 100 can further comprise a trim 110, which can be used to recess the light fixture 100 from a surface, such as a ceiling. The trim 110 can be used to focus light and/or otherwise shape light from the optic 106. The trim 110 is a visible portion of the light fixture 100 (e.g., with the optic 106, if viewed from a steep enough angle). The trim 110 can be circular, elliptical, square, or other shape. In some configurations a light fixture is used for a purpose other than a downlight (e.g., used as an adjustable fixture where the trim has less of an impact on the final beam). The reflector 104 reflects light from the light source(s) 102 toward the optic 106, the optic then modifies the light (e.g., refracts, diffuses, focuses, etc.). The optic 106 is arranged in conjunction with the trim 110 so the output surface of the optic 106 is at the top input aperture of the trim 110. The light fixture 100 can also include a heat sink (e.g., thermally coupled with the light source 102).

The optic 106 has a first surface 132 and a second surface 134, the second surface 134 being opposite the first surface 132. The first surface 132 is arranged to be closer to the light source 102 than the second surface 134. The first surface 132 and the second surface 134 are optical surfaces, meaning optic 106 is arranged for light to be transmitted through the first surface 132 and the second surface 134. For example, light from the light source 102 is first transmitted through the first surface 132 and then through the second surface 134.

The optic 106 is a lens. For example, the optic 106 is an injection molded lens and/or molded by hot embossing. The reflector 104 has a height H. In some embodiments, the height H sets a minimum distance between the plurality of light sources 102 and the optic 106 that is equal to or greater than 10, 15, 20, 30, 40 mm and/or equal to or less than 140, 120, 100, 80, 70, or 60 mm. In some configurations, the optic 106 comprises texturing on the second surface 134 and/or the first surface 132. For example, the second surface 134 of the optic is etched or molded to have texture. In some configurations, a diffusing element (e.g., a thin film) is applied to the second surface 134. In some configurations, the thin film is a separate element that is assembled at an output face of the lens. The thin film can ben element separate from the lens and placed in an assembly with the lens (e.g., the second surface 134 can be clear and/or have a light texture on it). In some embodiments, the film is oblong in order to stretch the beam purposely wider in one direction. Beams like 1×60, 1×90, 15×30, 30×60, etc can be formed. For example, a 30×60 film will stretch the beam by 30 degrees in one direction and 60 degrees in a direction orthogonal to the first direction, thereby creating an oblong beam. This can be used for situations like hallways.

Some oblong beams are formed from narrow beams rather than batwing lenses. There is not necessarily a 1:1 relation in terms of how much the film will alter the original beam from the lens (e.g., a 30×60 film does not add 30 degrees and 60 degrees to the base beam). In some cases, a diffuser film is used to alter the base beam in such a way that shapes a beam that a tooled lens does not produce. For example, lenses can be produced to offer beams every 5 degrees from 5 through 60 degrees. If a 32.5 degree beam or perhaps a 65 degree beam is desired for a specific application, then a film can be used to alter the distribution from the available lenses to hit a desired target, without tooling up a new lens. In some configurations, two film elements are combined with the lens to further modify the beam. In some configurations, a molded accessory is used in combination with, or in lieu of, a film, which could be considered a “2.5 degree” or “1 degree” adder such that whatever lens is used the molded accessory used with the lens simply widens the base lens by a pre-determined amount.

Figure 2A:
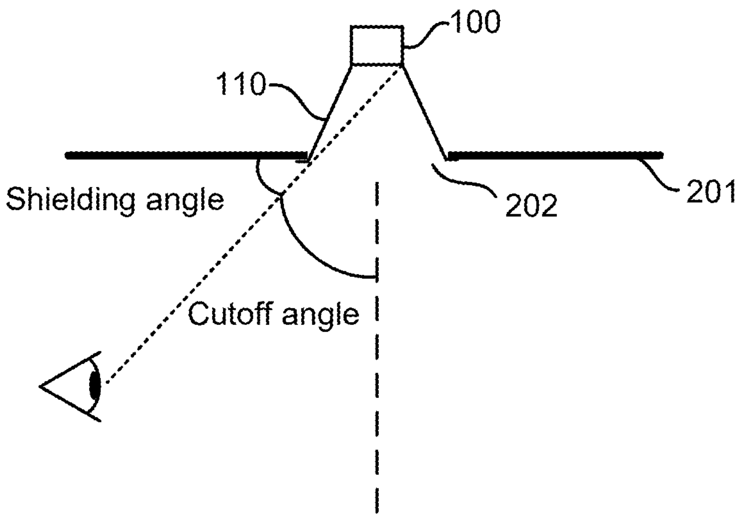
FIGS. 2A and 2B depict examples of cutoff angles of light fixtures.

FIG. 2A illustrates a light fixture 100 installed in a ceiling 201. The light fixture 100 can be a recessed downlight designed to effectively reduce or minimize glare and control light distribution. The output aperture 202 of the trim 110 is flush with a surface of the ceiling 201. The majority of the light fixture 100 is concealed, creating a clean and unobtrusive appearance. The trim 110 provides a cutoff angle that shields the light source from an observer's direct view. The cutoff angle is the maximum angle, measured from the vertical, at which light is allowed to project from the light fixture 100 to the observer. As shown in FIG. 2A, The height of the trim 110, the diameter of the optic, and the diameter of the output aperture of the trim 110 define the cutoff angle. A shielding angle is the compliment of the cutoff angle.

Figure 2B:
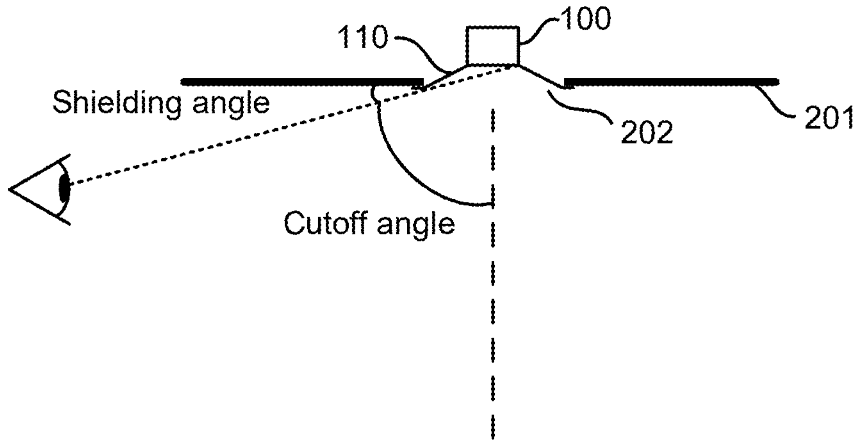

As illustrated in FIG. 2B, decreasing the height of trim 110 can expand the cutoff angle, which in turn leads to earlier visibility of the source and possibly a significant increase in glare. Therefore, to reduce glare and/or to make the lighting more comfortable for the eyes, the light fixture 100 is designed to control the cutoff angle to 55 degrees or smaller. In some embodiments, the cutoff angle is 50 degrees or smaller. For instance, in some embodiments the trim 110 has an output aperture of 6 inches and a cutoff angle of 50 degrees or smaller.

Figure 3A:
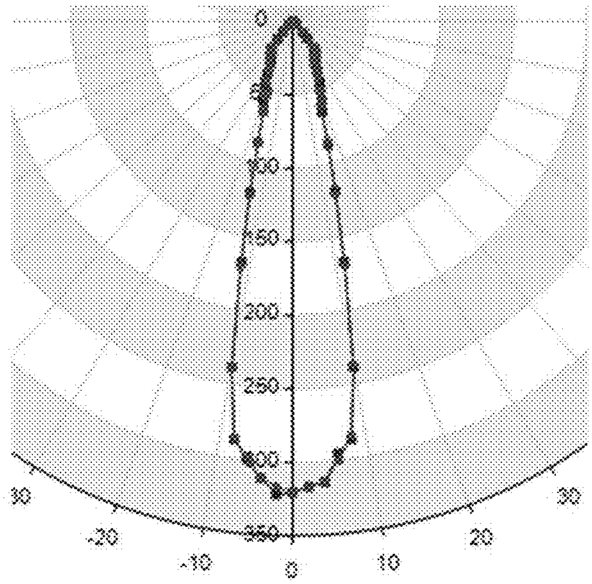
FIG. 3A depicts a photometric polar diagram of an embodiment a reflector of a light fixture.
Figure 3B:
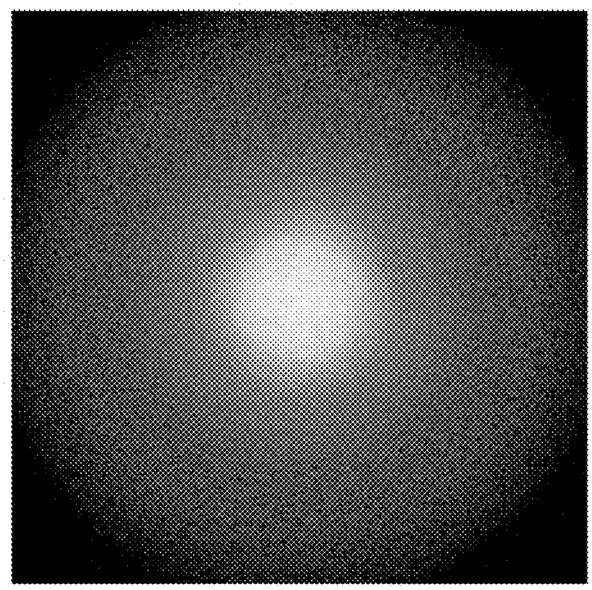
FIG. 3B is an image of illumination from the reflector in FIG. 3A.

FIG. 3A depicts a photometric polar diagram of an embodiment a reflector of a light fixture. The diagram shows light output from the one or more light sources 102 with the reflector 104, and without the optic 106 or trim 110, from FIG. 1. FIG. 3B is an image of illumination from the reflector and light source in FIG. 3A. The illumination beam is narrow.

Figure 4A:
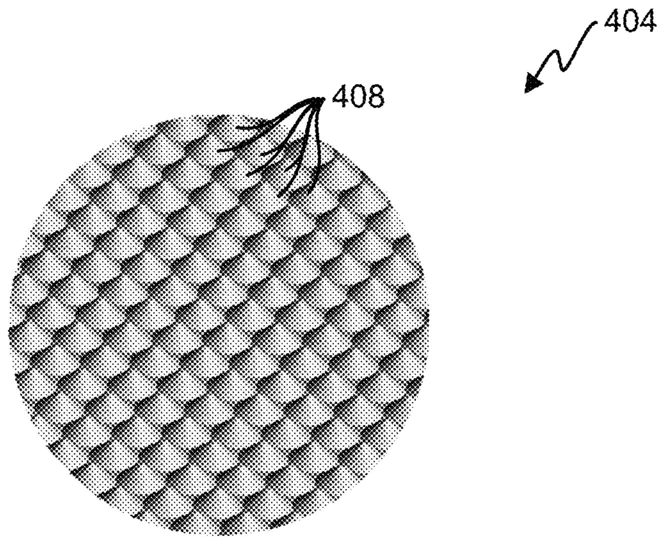
FIG. 4A is a perspective rendering of an embodiment of a optical array.

FIG. 4A is a perspective rendering of an embodiment of an optical array on a portion of a lens 404. The lens 404 can be used as the optic 106 in FIG. 1. The reflector 104 in FIG. 1 is arranged to reflect a portion of light from a plurality of light sources (e.g., one or more light sources 102 in FIG. 1) to the lens 404. The lens 404 comprises an optical surface (e.g., the first surface 132 in FIG. 1). A plurality of protrusions 408 extend from the optical surface of the lens (e.g., in a direction normal to the optical surface of the lens). The protrusions 408 are solid (e.g., not hollow). The protrusions 408 can be a solid geometric feature with two or more surfaces. The protrusion 408 can be referred to as a prism, in some embodiments, using total-internal reflection from at least one side. In the embodiment shown in FIG. 4A, the protrusions 408 are cones. The cone is a solid shape bounded by a circular base and at least one flat surface (e.g., a slanted wall). The apex of the conde is rounded (e.g., for easier manufacturing). Not all the protrusions 408 are labeled to not unduly clutter the figure.

Figure 4B:
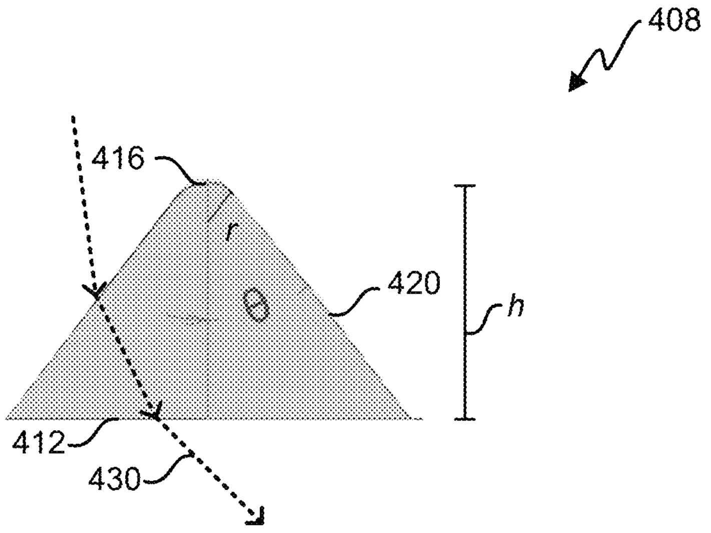
FIG. 4B is a side view of an embodiment of a cone.

FIG. 4B is a side view of a vertical cross section of an embodiment of a protrusion 408 from FIG. 4A. The protrusion 408 is defined by a base 412 and an apex 416. The apex 416 is the highest point of the protrusion 408, away from the base 412. The apex 416 is rounded (e.g., having a radius of curvature r). At least a portion of a wall 420 of the protrusion 408, between the base 412 and the apex 416, is straight (e.g., is straight in a vertical cross section of the protrusion 408). In FIG. 4B, the portion of the wall 420 of a protrusion that is straight is a slant of the cone. The portion of the wall 420 that is straight is configured to receive light from at least a subset of the plurality of light sources. For example, some light from the one or more light sources 102 in FIG. 1 is transmitted through the wall 420 of the protrusion 408 either directly or after reflecting off reflector. In some configurations, light emitted from every one of the one or more light sources might not transmit through every one of the protrusions 408 on the lens 404.

In FIG. 4B, the cone has an angle θ (a half-angle, measured between the axis and the slant). In some embodiments, the angle θ is equal to or greater than 10, 15, 20, 25, 30, 35, 40, or degrees and/or equal to or less than 60, 70, or 85 degrees. The protrusions (e.g., cones) are shaped to behave like prisms in accordance with Snell's law to take incoming light and bend it in a manner to create the final desired beam shape. For an example path, see path 430.

In some embodiments, protrusions 408 can be other shapes, such as a pyramids or half cone. In some embodiments, the heights h of protrusions are the same. In some embodiments, heights h of the protrusions 408 vary. In some embodiments, a vertical cross section of the protrusion 408 is a smooth function.

In some configurations, protrusions 408 are combined with other optical features, such as ridges (e.g., as described in the commonly owned '898 patent application).

Figure 4C:
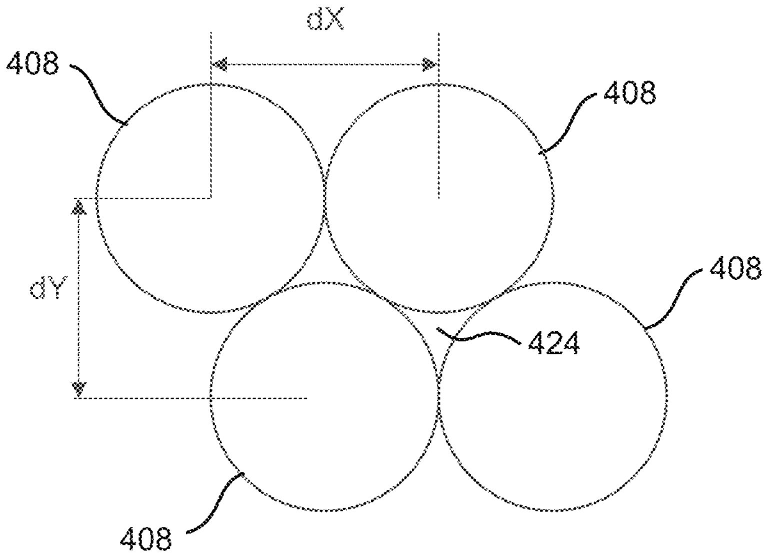
FIG. 4C is a top view of an embodiment of a spacing diagram for an optical array.

FIG. 4C is a top view of an embodiment of a spacing diagram for an optical array. The top view is a horizontal cross section of a several protrusions 408 at bases of the protrusions 408. In FIG. 4C, dX is a center-to center-spacing in one dimension and dY is a center-to-center spacing in a second dimension. In FIG. 4C, the x dimension is orthogonal to the y dimension. In some embodiments, the center-to-center spacing in one dimension (e.g., dY and/or dX) is equal to or greater than 0.5, 0.75, or 1 mm and/or equal to or less than 1, 1.5, 2, 2.5, or 3 mm. For example, to maintain an even hexagonal pattern dY is less than or equal to dX*sqrt(3)/2. In some configurations, protrusions 408 do not overlap each other (e.g., a base of one cone doesn't overlap with a base of a neighboring cone so that flat regions 424 are present). A size of a protrusion 408 (e.g., diameter of the base) and/or a number of protrusions 408 can be important, in some situations. A lot of protrusions 408 are used to smear out images of the LES by each cone so the resultant beam looks diffuse (a person cannot see individual LEDs. But if the base of the protrusion 408 is too small, then there won't be much of a sidewall (e.g., 420 in FIG. 4B) to refract light. And if there are too few protrusions 408, then the lens might look more like a bike reflector than a diffusing element. Too small of a cone can also be challenging (e.g., costly) to manufacture. In some embodiments, a lens has a number of protrusions equal to or greater than 5 k, 6 k, 8 k, or 9 k and/or equal to or less than 10 k, 12 k, 16 k, 20 k, or 25_k_. In some configurations, a width of the base 412 of the protrusion in the x dimension is no more than 1, 1.5, 2.5, or 3 times the width of the base 412 in the y dimension, and the width of the base in the y dimensions is no more than 1, 1.5, 2.5, or 3 times the width of the base 412 in the x dimension. Spacing such that dX is greater than the base 412 diameter D*sqrt(3)/2 produces flat regions 424 between the protrusions 408. The flat regions 424 create pathways for more direct light to exit the lens, causing for more center beam peaks in candela. Accordingly, bases 412 overlap in some configurations. For example, bases in FIG. 4C can overlap to an extent that flat region 424 is reduced or is not present. In some embodiments, a length of a base of a protrusion is equal to or less than a center-to-center spacing of the protrusions; a base of a protrusion touches a base of neighboring protrusion; a length of a base of a protrusion is equal to or greater than a center-to-center spacing of the protrusions so that there is overlap between protrusions; and/or the length of the base of the protrusion is equal to or greater than the center-to-center spacing of the protrusions so that there is no flat region (e.g., region 424) between protrusions.

Figure 5A:
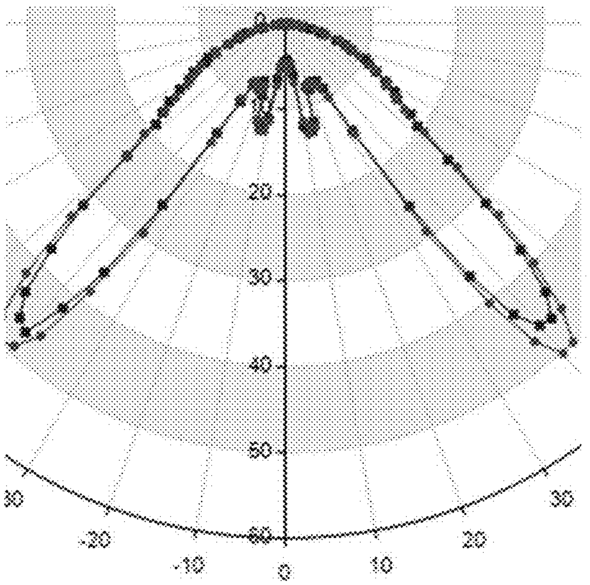
FIG. 5A depicts a photometric polar diagram of an embodiment of a lens with an optical array.
Figure 5B:
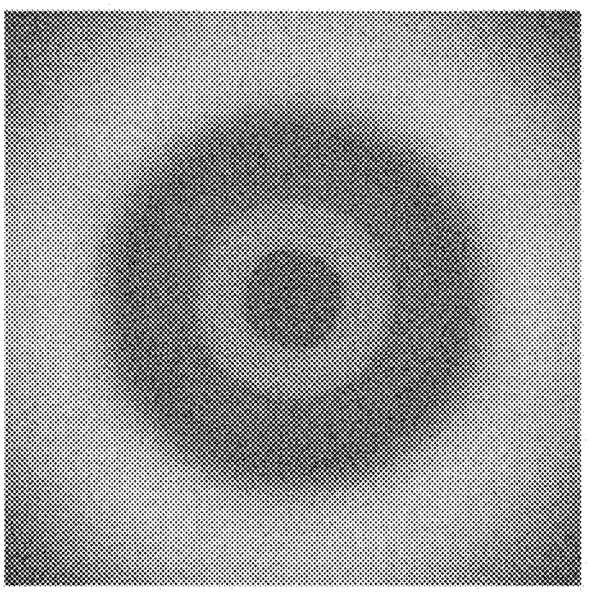
FIG. 5B is an image of illumination from the lens with the optical array in FIG. 5A.

FIG. 5A depicts a photometric polar diagram of an embodiment of a lens with an optical array. The diagram shows light output from the one or more light sources 102 with optic 106 from FIG. 1, and the lens 404 from FIG. 4A used as the optic 106. There is no texture on the output face of the lens (e.g., second surface 134 in FIG. 1), and there is no trim. FIG. 5B is an image of illumination from the light sources and optic in FIG. 5A. The illumination beam is more intense at the sides and darker in the center.

Figure 6A:
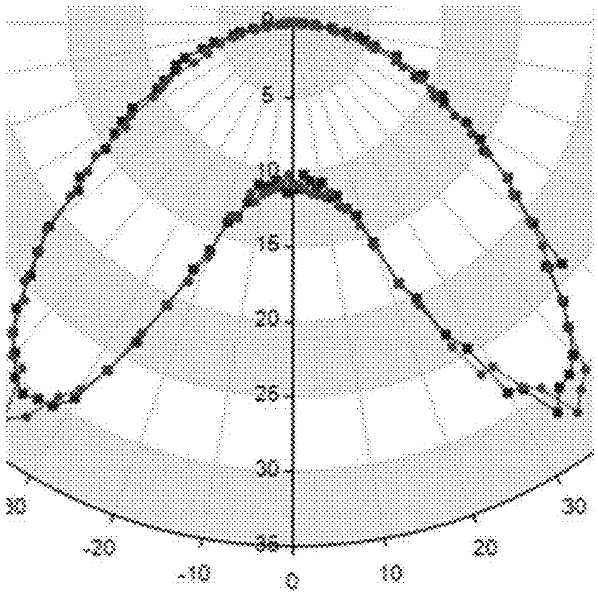
FIG. 6A depicts a photometric polar diagram of an embodiment of a lens with diffusion and an optical array.
Figure 6B:
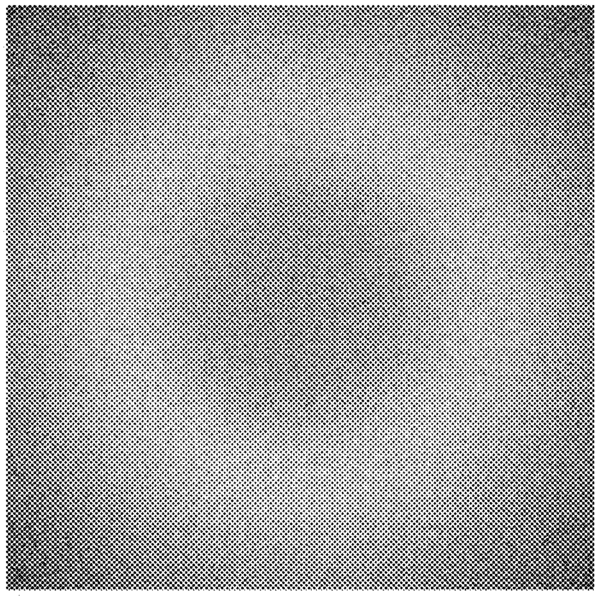
FIG. 6B is an image of illumination from the lens in FIG. 6A.

Diffusion can be used to further shape light for a light beam. FIG. 6A depicts a photometric polar diagram of an embodiment of light through a lens with diffusion (e.g., texture) and an optical array. There is no trim. The diagram shows light output from the one or more light sources 102 with optic 106 from FIG. 1, an optical array (e.g., from FIG. 4A) on the first surface 132 of the optic and diffusion features (e.g., etched, molded, or applied) on the second surface 134. FIG. 6B is an image of illumination from the lens in FIG. 6A. The illumination beam is wide, but does not have as narrow lobes as the beam in FIGS. 5A and 5B.

Figure 7A:
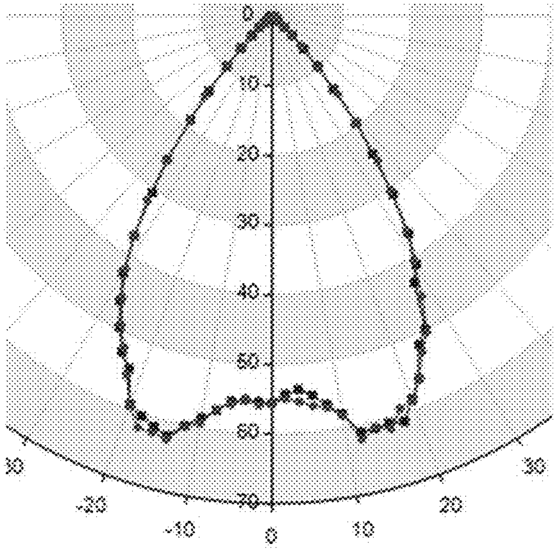
FIG. 7A depicts a photometric polar diagram of an embodiment of a light fixture with a reflector and, a lens with diffusion having an optical array, and a semi-specular trim.
Figure 7B:
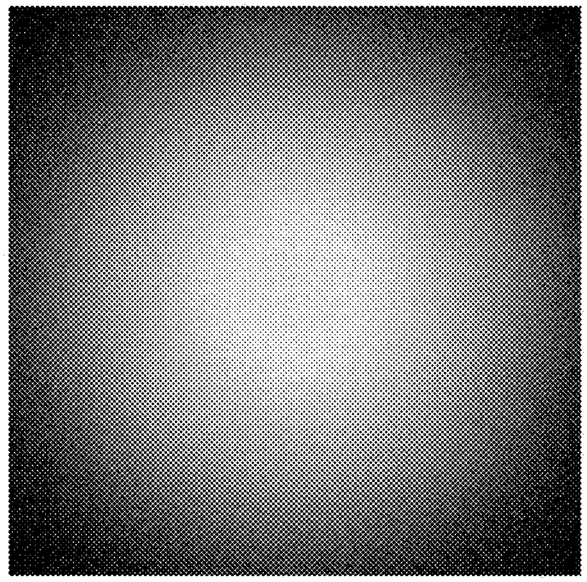
FIG. 7B is an image of illumination from the light fixture in FIG. 7A.
Figure 7C:
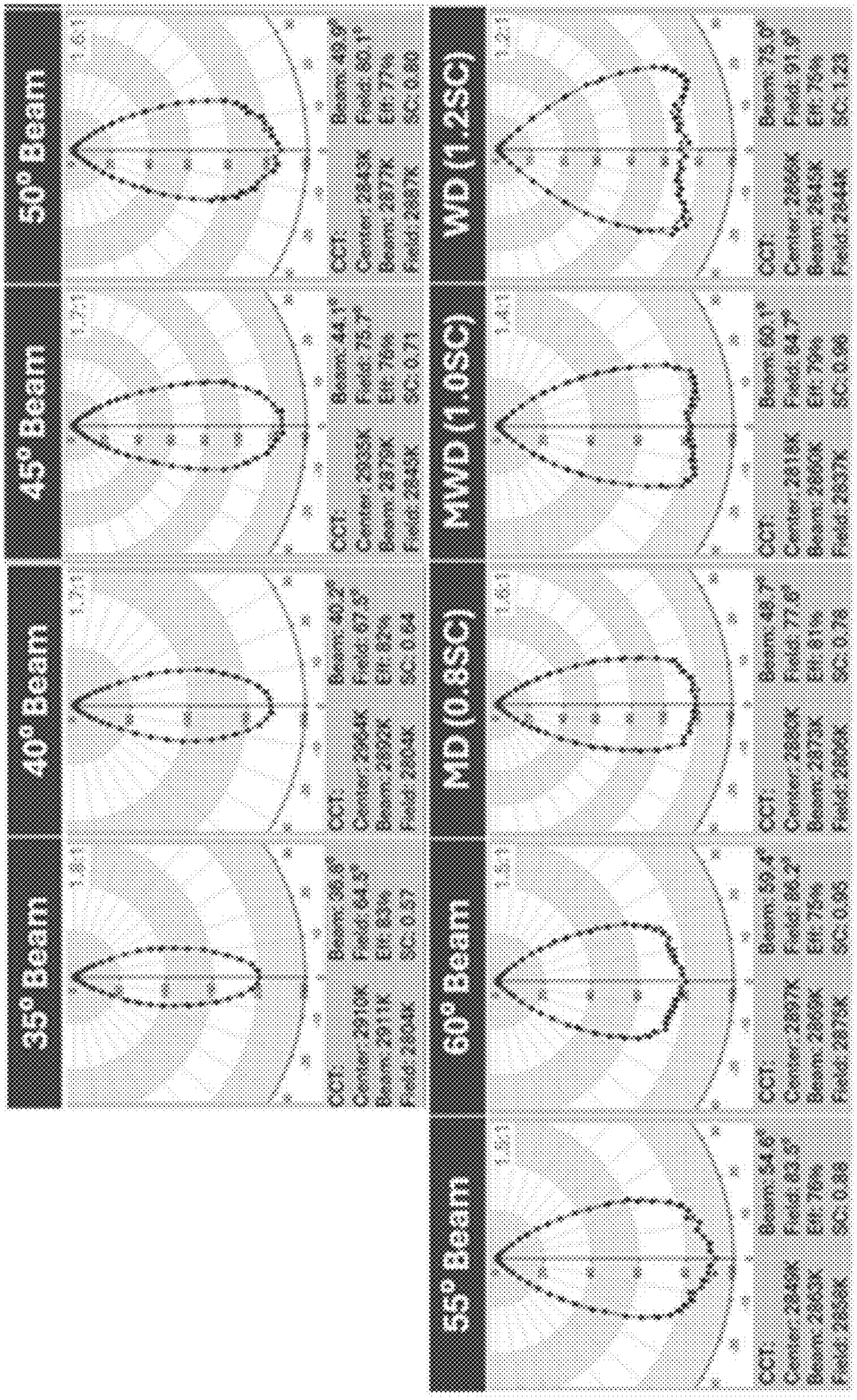
FIG. 7C depicts photometric polar diagrams of several different types of beams.

FIG. 7A depicts a photometric polar diagram of an embodiment of a light fixture with a reflector, a lens having an optical array, and trim. The reflector is the same reflector used in FIGS. 3A and 3B, and the lens is the same lens used in FIGS. 6A and 6B (e.g., a lens with protrusions and texture). FIG. 7B is an image of illumination from the light fixture in FIG. 7A. The illumination beam is a flat illumination beam, such as a batwing shape. Though a batwing beam shape is used as an example, the lens is not limited to batwing shape beams. A lens can be designed to produce more traditional shaped beams that peak in the center of the beam and fall off gradually. These beams are usually rated as Full Width Half Max (the full angle at which the beam falls of from half of the candlepower in the center of the beam. FIG. 7C depicts photometric polar diagrams of several different types of beam examples the lens can be used to produce. In some embodiments, flat illumination is no more than 10%, 15%, or 20% variance for a 30, 40, 45, or 50 degree span in a photometric polar diagram (e.g., a 40 degree span measured from negative 20 degrees to positive 20 degrees for light arranged to direct illumination downward).

Figure 8:
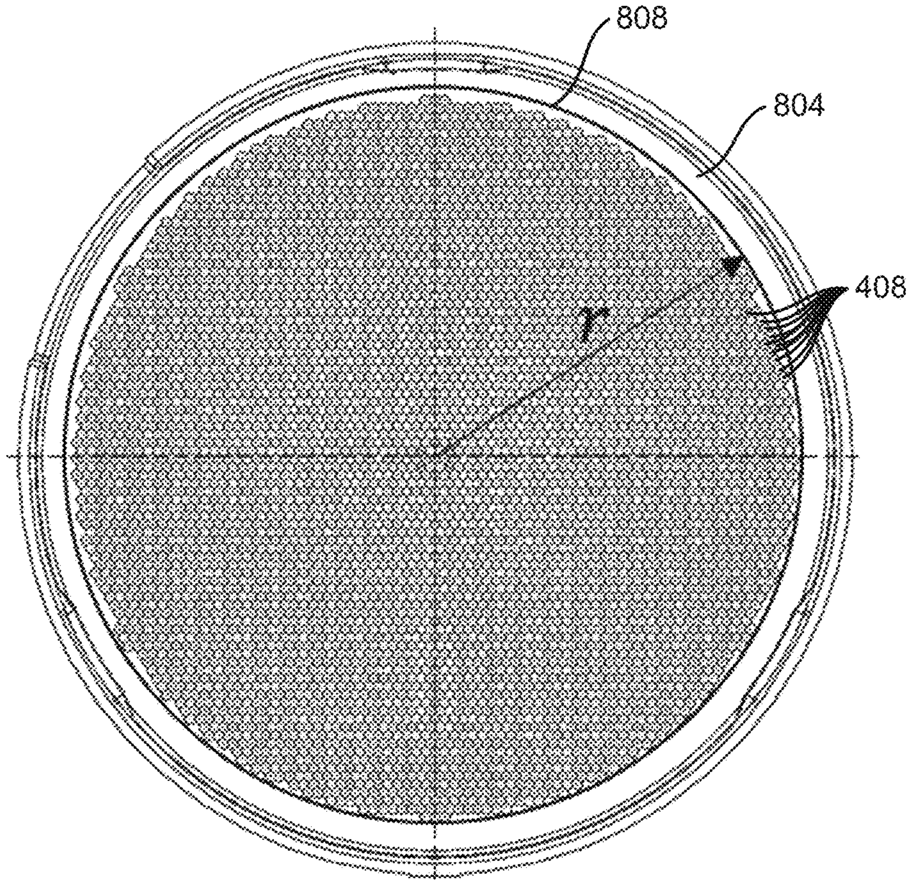
FIG. 8 is a top-view diagram of an embodiment of a lens with an optical array.

FIG. 8 is a top-view diagram of an embodiment of a lens 804 with an optical array 808. The optical array 808 comprises a plurality of protrusions 408. Not all protrusions 408 are labeled so as to not unduly clutter the figure. The protrusions 408 are arranged in a geometrical array. Though the protrusions 408 are arranged in a hexagonal array, other shapes of arrays could be used (e.g., triangular, rectangular, pentagonal, heptagonal, octagonal, etc.). A hexagonal array can be preferred in some configurations for a balance of base size and shape (e.g., circular), and design complexity and efficiency. The protrusions 408 are conical (e.g., as shown in FIG. 4B). Though a static array of protrusions can be used (e.g., all protrusions 408 are the same size), a size (e.g., base diameter, height from base to apex, and/or half angle) of a protrusion can be varied to improve performance. In some embodiments, a half angle (angle θ in FIG. 4B) of the protrusions 408 varies as a function of distance (radius r) from a center of the lens 804.

Figure 9:
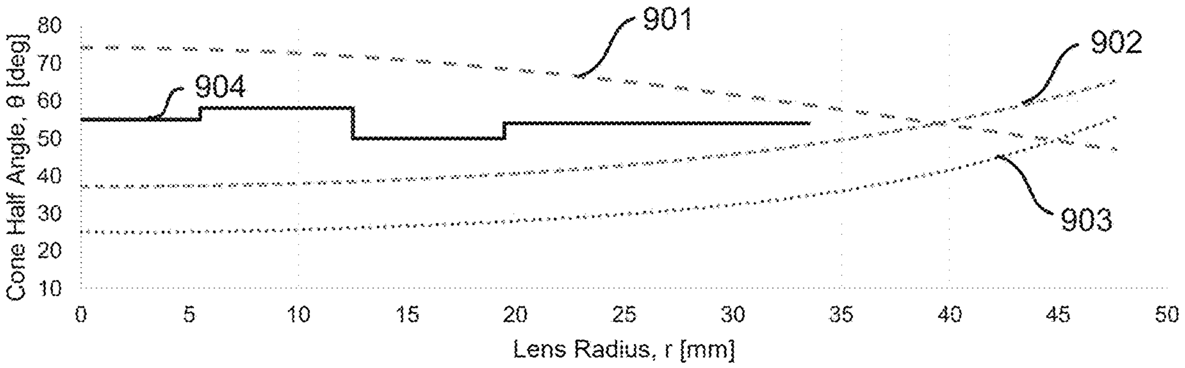
FIG. 9 is a graph of various embodiments of an optical array that varies as a function of lens radius.

FIG. 9 is a graph of various embodiments of functions for a conical array where half angle varies as a function of lens radius r. FIG. 9 depicts four functions, a first function 901, a second function 902, a third function 903, and a fourth function 904. The function can be a step function (e.g., the fourth function 904), or a smooth function (e.g., the first function 901, the second function 902, and/or the third function 903). The first function 901 is an example for a medium beam (e.g., 0.8 spacing criterion). The second function 902 is an example for a medium-wide beam (e.g., 1.0 spacing criterion). The third function 903 is an example for a wide beam (e.g., 1.2 spacing criterion). The fourth function 904 is an example for a medium-wide beam (e.g., 1.0 spacing criterion) using a step function.

Figure 10:
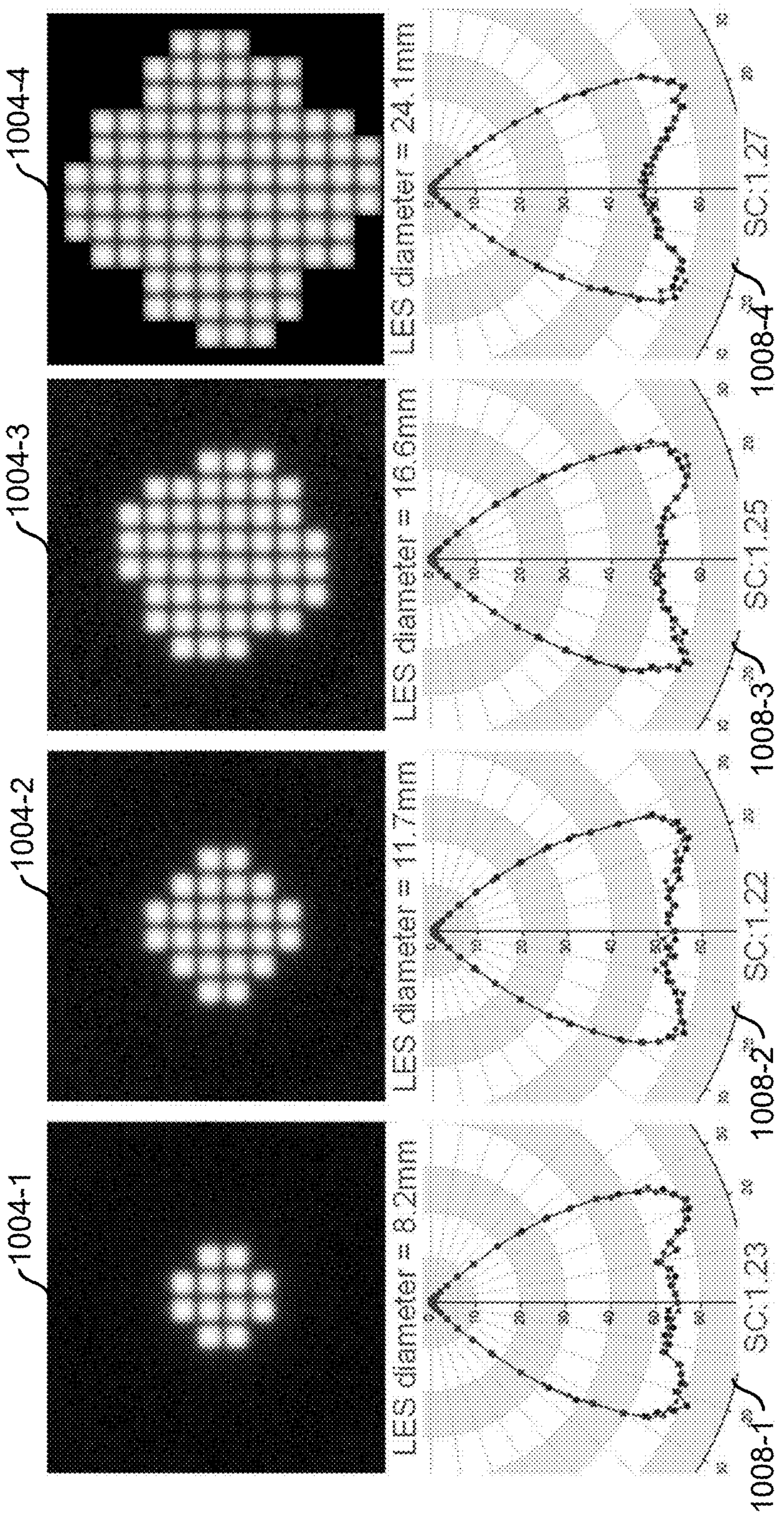
FIG. 10 depicts beam variance of an embodiment of a lens paired with different light emitting surfaces (LES).

FIG. 10 depicts beam variance of an embodiment of a lens paired with different light emitting surfaces (LESs) 1004. Each LES 1004 comprises a plurality of light sources (e.g., LEDs). The LES 1004 can be used for the one or more light sources 102 in FIG. 1. The first LES 1004-1 has 12 LEDs and a diameter of 8.2 mm, the second LES 1004-2 has 24 LEDs and a diameter of 11.7 mm, the third LES 1004-3 has 48 LEDs and a diameter of 16.6 mm, and the fourth LES 1004-4 has 144 LEDs and a diameter of 24.1 mm.

FIG. 10 also shows four diagrams 1008, which correspond to the lens paired with the LES 1004. The diagrams 1008 are photometric polar diagrams. A first diagram 1008-1 is for light output from a light fixture using the first LES 1004-1, a reflector, and the lens. A second diagram 1008-2 is for light output from a light fixture using the second LES 1004-2, the reflector, and the lens. A third diagram 1008-3 is for light output from a light fixture using the third LES 1004-3, the reflector, and the lens. A fourth diagram 1008-4 is for light output from a light fixture using the fourth LES 1004-4, the reflector, and the lens.

The first diagram 1008-1 has a measured spacing criterion (SC) of 1.23. The second diagram 1008-2 has a measured SC of 1.22. The third diagram 1008-3 has a measured SC of 1.25. The fourth diagram 1008-4 has a measured SC of 1.27. As can be seen from diagrams 1008, the spacing criterion varies little for different LESs 1004 using the same lens. FIG. 10 shows beam performance does not change (very much, if any) based on the number of LEDs or the LES diameter. This type of performance is not achieved with a Fresnel lens. It can be beneficial to use just one lens for different LESs. Using one lens design for multiple LESs can simplify logistics and manufacturing by reducing a number of different types of lenses to produce.

Figure 11:
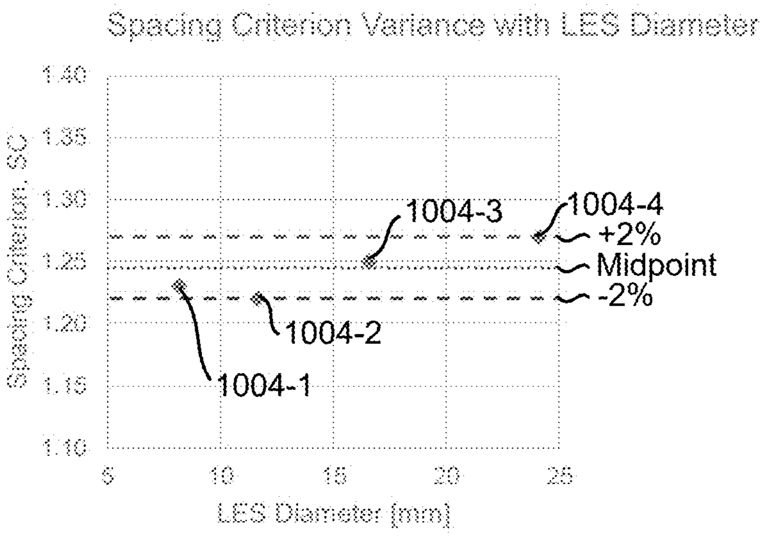
FIG. 11 depicts spacing criterion variance with LES diameter for an embodiment of a lens with an optical array.

FIG. 11 depicts a graph of spacing criterion variance with LES diameter for an embodiment of a lens having an optical array. The horizontal axis is LES diameter. The vertical axis is spacing criterion (SC). Plots of the LESs 1004 on the graph are shown. For the four LESs 1004 shown, SC varies by only +/−2%.

Figure 12:
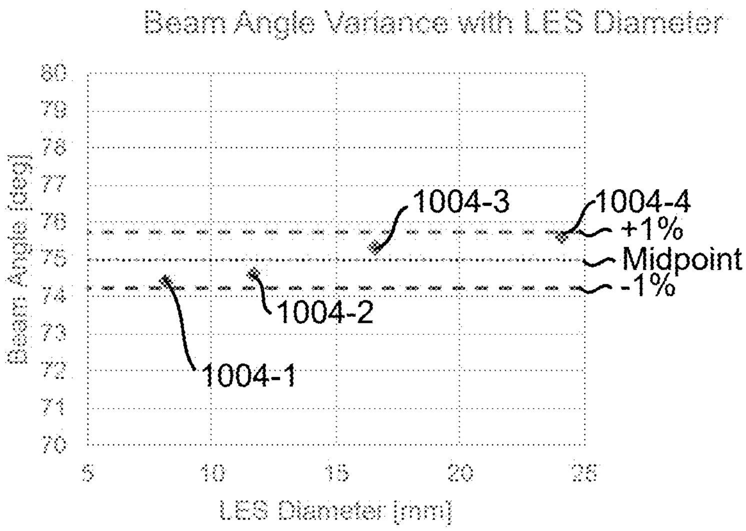
FIG. 12 depicts beam-angle variance with LES diameter for an embodiment of a lens with an optical array.

FIG. 12 depicts a graph of beam angle variance with LES diameter for an embodiment of a lens having an optical array. The horizontal axis is LES diameter. The vertical axis is beam angle in degrees. Plots of the LESs 1004 on the graph are shown. For the four LESs 1004 shown, beam angle varies by only +/−1%.

The graphs in FIGS. 11 and 12 further show the invariance of beams for different diameter LESs using the same lens.

Figure 13:
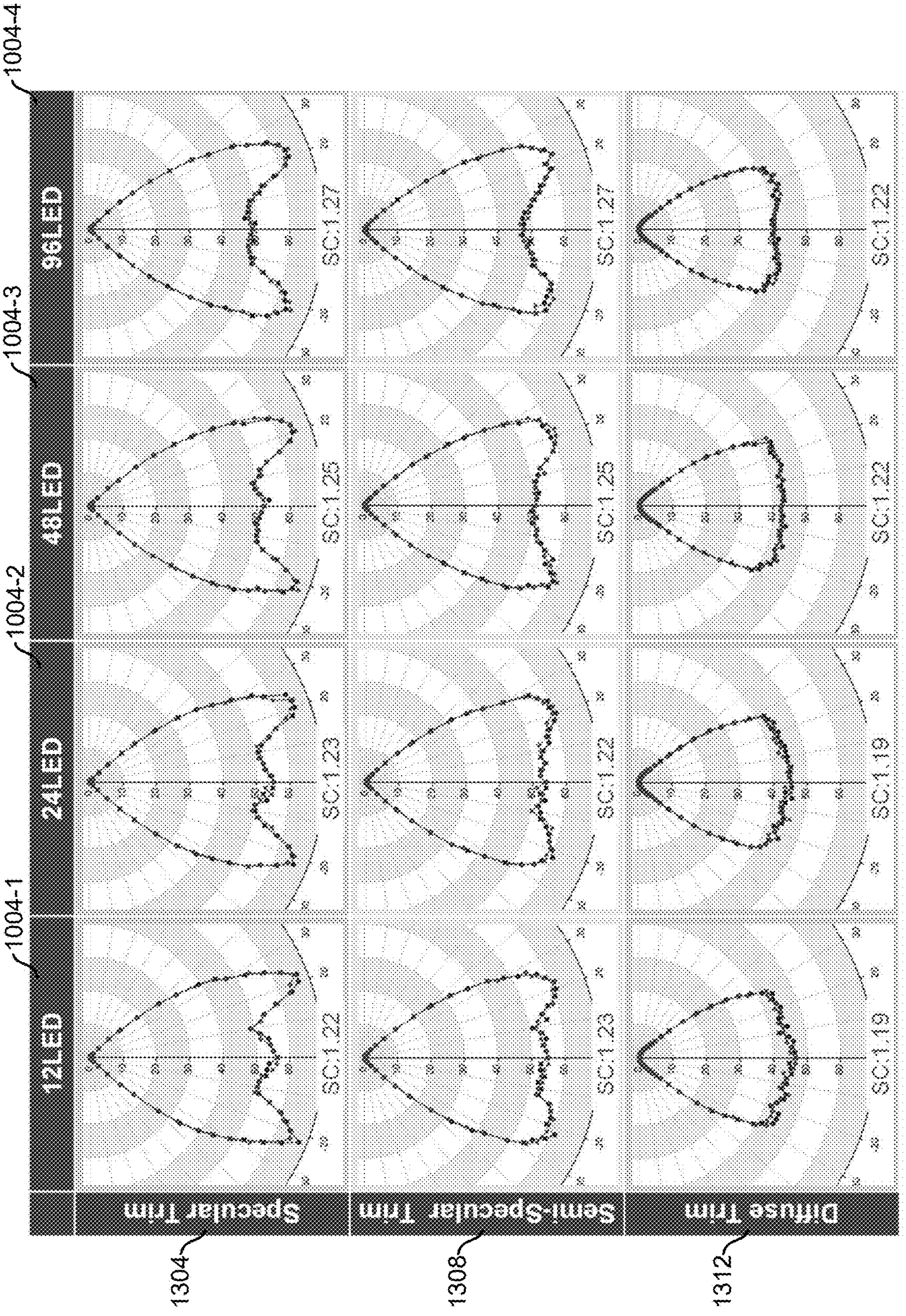
FIG. 13 shows trim finish variance across multiple LES sizes for an embodiment of a lens with an optical array.

The lens also exhibits trim invariance. A trim, such as trim 110 in FIG. 1, can be added to a light fixture. FIG. 13 shows trim variance for an embodiment of a lens having an optical array. Photometric polar diagrams are shown for different LESs 1004 and different trim finishes. The different trims are specular trim 1304, semi-specular trim 1308, and a diffuse trim 1312.

As can be seen in FIG. 13, there is not much SC variance using different trims with the same lens. Thus, the same lens can be used for multiple different types of trims. The lens can be used with or without a trim.

Figure 14:
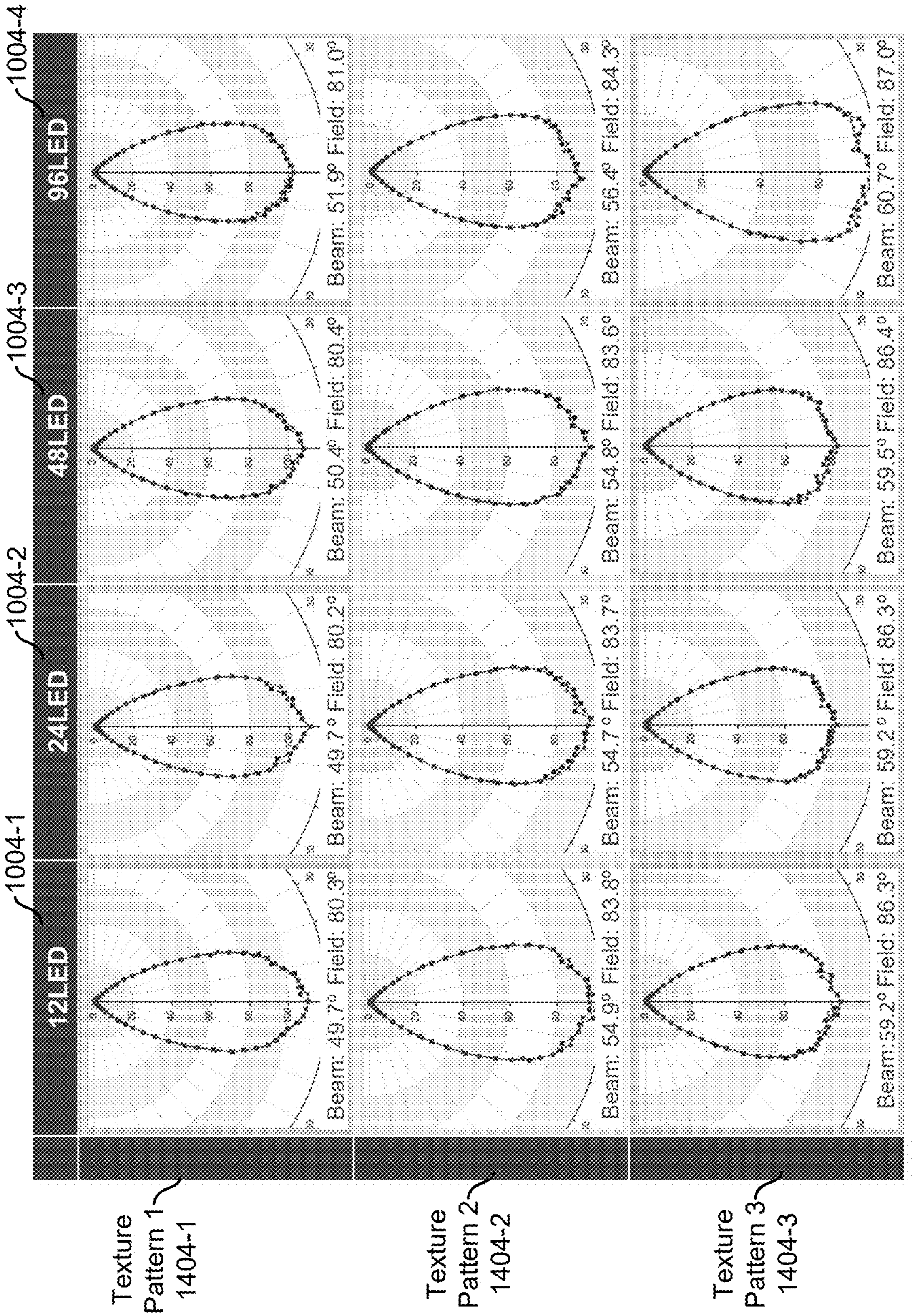
FIG. 14 shows beam variance for three distinct beam widths by varying only the texture for embodiments of a lens with the same optical array.
Figure 15:
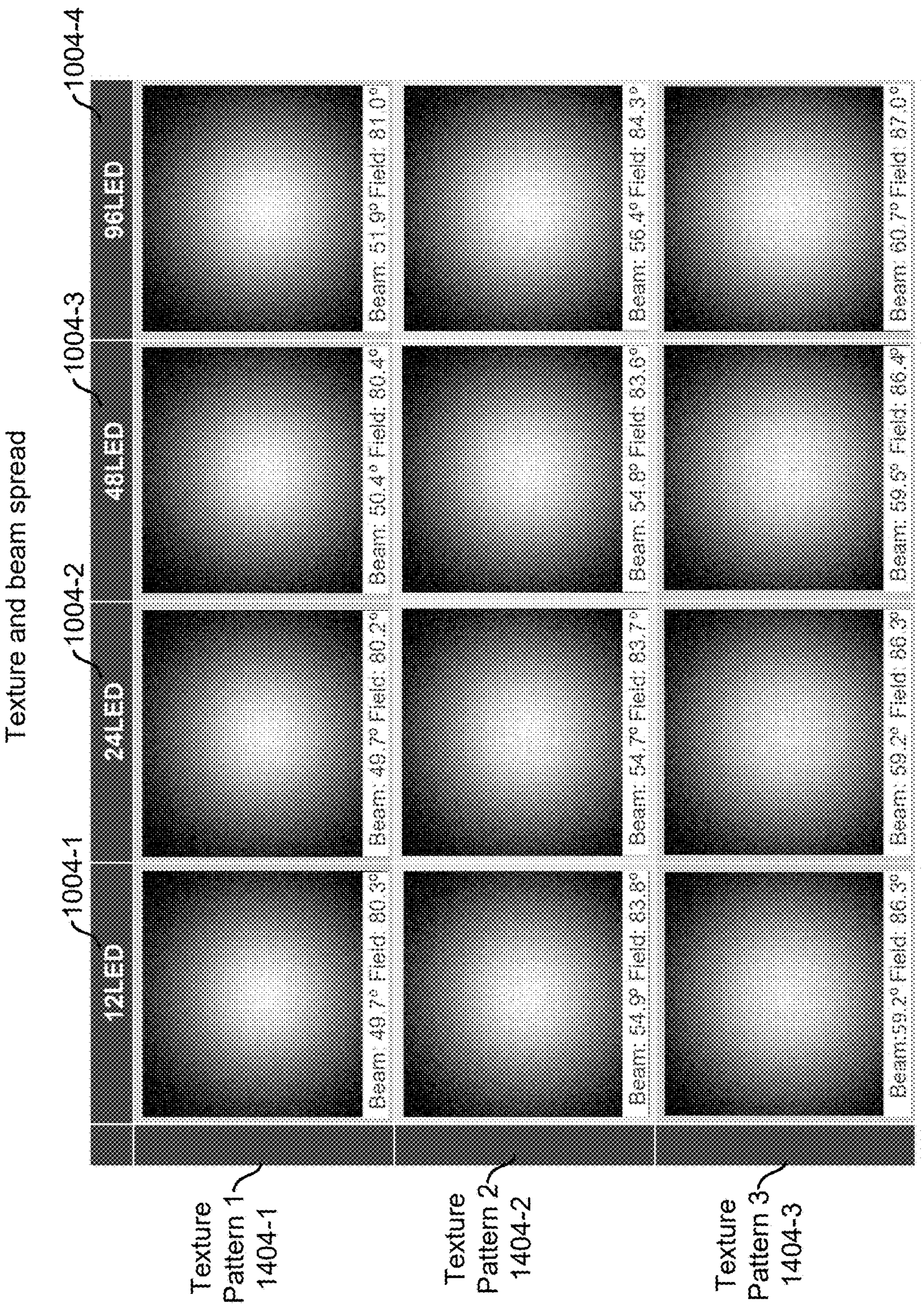
FIG. 15 depicts images of illumination from configurations in FIG. 14.

FIG. 14 shows beam variance for various texture patterns embodiments for a light fixture with an LES, a reflector, and a lens having an optical array. Photometric polar diagrams are shown for different LESs 1004 and different textures on the lens. In FIG. 14, there is a first texture pattern 1404-1, a second texture pattern 1404-2, and a third texture pattern 1404-3. The third texture pattern 1404-3 is rougher than the second texture pattern 1404-2, and the second texture pattern 1404-2 is rougher than the first texture pattern 1404-1. Increased texture is used to widen the beam. The third texture pattern 1404-3 has a smaller standard deviation across LESs 1004 than the second texture pattern 1404-2, and the second texture pattern 1404-2 has a smaller standard deviation across LESs 1004 than the first texture pattern 1404-1. The rougher the texture the less variance and more beam spread. Beam angle is based on spacing criterion. In some situations, such as lower spacing criterion situations, less texture is preferrable so there is less beam spread. FIG. 15 depicts images of illumination from configurations in FIG. 14. To first order, the reflector roughs in the shape of the narrowest beam (e.g., though the reflector height, input diameter, output diameter, profile shape, and/or finish). Protrusions are used to start to widen that beam, and a texture is used to provide smoothing of the beam and color. A combination of protrusions and texture can produce a narrowest peaked beam achievable for a light fixture. For a wider beam, additional texture and/or a change in protrusion profile can be used to produce wider beams. There can be a trade-off between a preferred optical recipe, number and cost of buying different tooling for each side, and/or aesthetics of the lens itself. Protrusion re-tooling can more expensive than texture tooling, so in some embodiments, a minimum protrusion design is used, and progressively heavier texturing is used for wider beams. In some embodiments, keeping lens designs with the same texture on the output face and changing the input protrusion to widen (or narrow) a beam is done because keeping the same texture can keep the aesthetics of the lens and fixture across many beams nearly identical since the texture is what is visible when installed, and the protrusion pattern is hidden. A light texture and shallow protrusion pattern for the narrowest beam design is used, for a wider beam, heavier texture and/or taller protrusions can be used.

Figure 16:
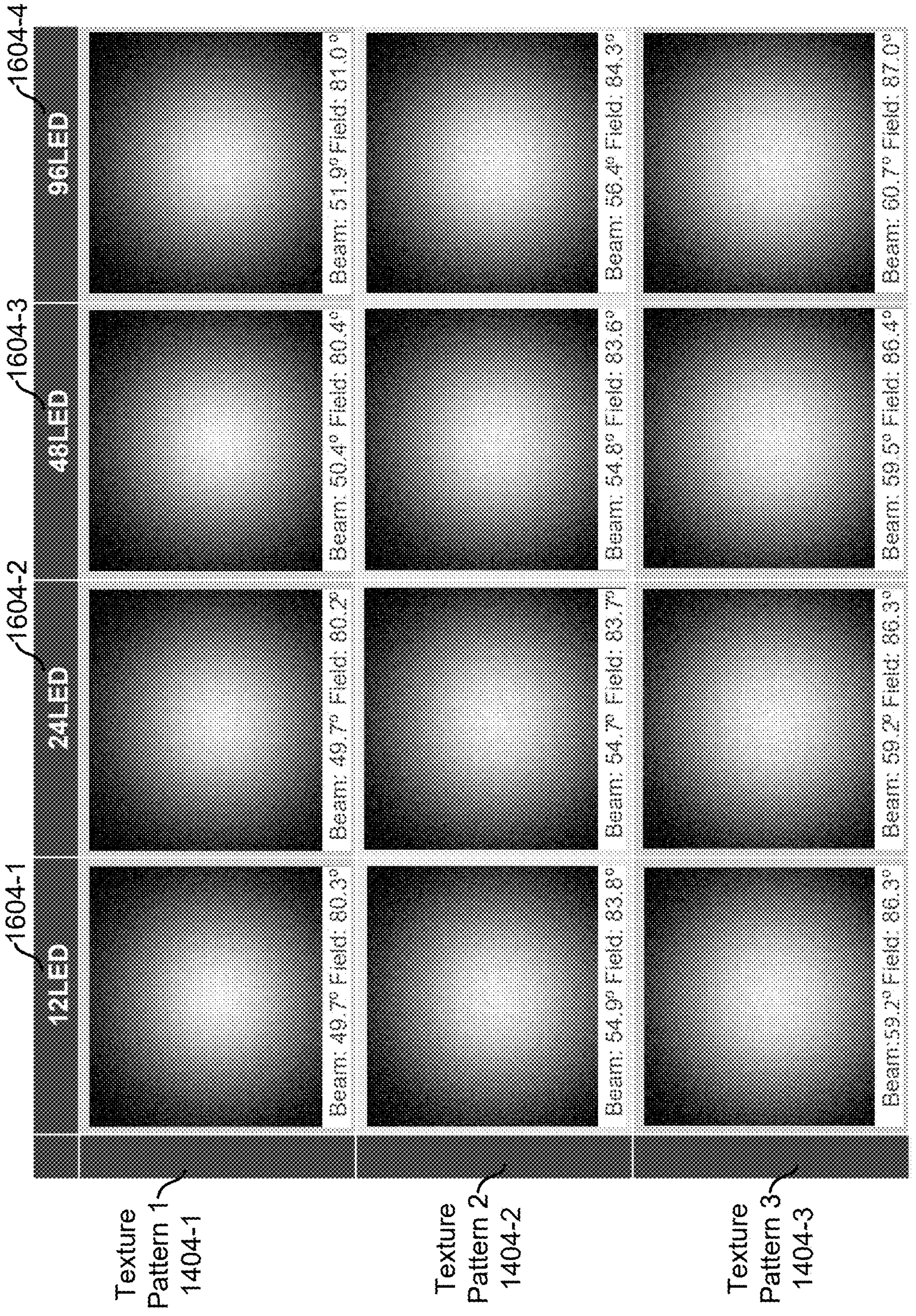
FIG. 16 shows images of illumination from light sources having multiple colors from configurations in FIG. 14.

FIG. 16 shows images of illumination from configurations in FIG. 14 from light sources having multiple colors. In FIG. 16, there are four LESs 1604. Each LES 1604 comprises a plurality of light sources (e.g., LEDs). The first LES 1604-1 has 12 LEDs, the second LES 1604-2 has 24 LEDs, the third LES 1604-3 has 48 LEDs, and the fourth LES 1604-4 has 144 LEDs. The LESs 1604 in FIG. 16 are similar to LESs 1004 in FIG. 10 except the LESs 1604 in FIG. 16 comprise two light sources (e.g., LEDs), a first light source and a second light source, that are different colors. For example, the first light source has a first peak wavelength, the second light source has a second peak wavelength, and the first peak wavelength is different from the second peak wavelength by a difference that is equal to greater than 5%, 10%, 20%, or 30% and/or equal to or less than 60%, 70%, 85%, or 100% of the lower peak wavelength; or the difference is equal to or greater than 20, 30, 100, 150, or 200 nm and equal to or less than 300 or 400 nm. In some embodiment the first light source has a first color temperature, the second light source has a second color temperature, and the second color temperature is higher on the Kelvin scale than the first color temperature, wherein a difference between the second color temperature and the first color temperature is equal to or greater than 200, 400, 500, or 1000 Kelvin and equal to or less than 5000, 4000, or 3000 Kelvin. For example, half the LEDs in the LES 1604 emit light at 5500 Kelvin and the other half emit light at 6500 Kelvin; or a first third of the LEDs in the LES 1604 emit light at 5500 Kelvin, a second third emit light at 6500 Kelvin, and a third third emit light at 7000 Kelvin; or one LED emits light at 4500 Kelvin and the other LEDs emit light at 5000 Kelvin. In some configurations, light sources of different colors are interwoven or mixed within an arrangement, such as arranged in a checkerboard fashion. In some configurations, a white beam is formed with LEDs having two or more different color temperatures.

FIG. 16 shows that for a mixed color LES, the resulting illumination beam appears to be one color. Each protrusion of the protrusion array on the lens mixes light from the plurality of light sources with light passing through the other protrusions, causing the resulting beam to appear homogeneous in color.

Figure 17:
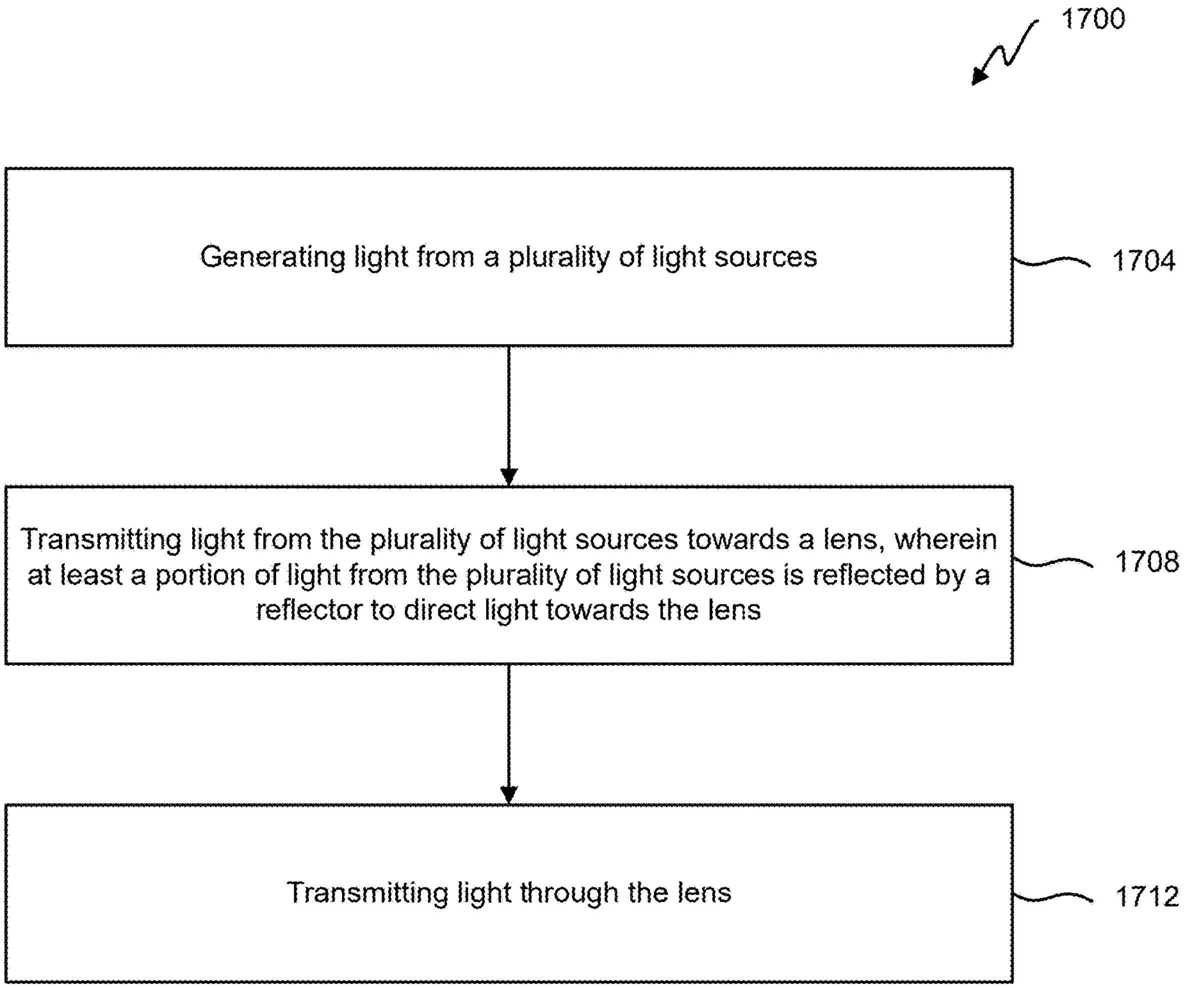
FIG. 17 illustrates a flowchart of an embodiment for a process of using a light fixture with a lens having an optical array.

FIG. 17 illustrates a flowchart of an embodiment of a process 1700 for using a light fixture with a lens having a protrusion array. Process 1700 begins with step 1704 with generating light from a plurality of light sources. For example, the one or more light sources are a plurality of LEDs that are part of an LES for one or more light sources 102 in FIG. 1.

In step 1708, light is transmitted from the plurality of light sources towards a lens (e.g., optic 106 in FIG. 1). At least a portion of light from the plurality of light sources is reflected by a reflector (e.g., reflector 104) to direct light towards the lens.

In step 1712, light from the plurality of light sources is transmitted through the lens. The lens comprises a plurality of protrusions extending from an optical surface of the lens, the plurality of protrusions are each defined by a base and an apex, and the apex is rounded (e.g., protrusion 408 in FIGS. 4A and 4B). At least a portion of a wall of the protrusion (e.g., wall 420 in FIG. 4B), between the base and the apex, is straight. The portion of the wall that is straight is arranged to receive light from at least a subset of the plurality of light sources. The portion of the wall that is straight is arranged to receive light from at least a subset of the plurality of light sources either directly (e.g., in a straight line) and/or indirectly (e.g., reflected by the reflector).

In some configurations, protrusions are rotationally symmetric about an axis that extends from a normal of the optical surface of the lens (e.g., conical). In some embodiments, the lens has zero optical power (e.g., the first surface 132 and the second surface 134 of optic in FIG. 1 are not used to focus or diverge light on a macro level of the optic 106; the first surface 132 is flat, without curvature, besides the protrusions; the second surface 134 is flat, without curvature, besides texturing). Though process 1700 includes an embodiment of a plurality of light sources, one light source is used in some embodiments.

Details are given in the above description to provide an understanding of the embodiments. However, it is understood that the embodiments may be practiced without some of the specific details. In some instances, well-known, processes, algorithms, structures, and techniques are not shown in the figures.

While the principles of the disclosure have been described above in connection with specific apparatus and methods, it is to be understood that this description is made only by way of example and not as limitation on the scope of the disclosure. Embodiments were chosen and described in order to explain principles and practical applications to enable others skilled in the art to utilize the invention in various embodiments and with various modifications, as are suited to a particular use contemplated. For example, protrusions can be formed on the second surface 134 of the lens in FIG. 1 and/or texture can be on the first surface 132; or protrusions and/or texture can be on both the first surface 132 and the second surface 134. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

What is claimed is:

1. A system for a light fixture comprising:
- a reflector arranged to reflect a portion of light from a plurality of light sources to a lens; and
- the lens comprising:
  - an optical surface; and
  - a plurality of protrusions extending from the optical surface of the lens, the plurality of protrusions each defined by a base and an apex, wherein:
    - the apex is rounded;
    - at least a portion of a wall of the protrusion, between the base and the apex, is straight;
    - the plurality of protrusions are cones;
    - the portion of the wall of the protrusion that is straight is a slant of the cone;
    - each cone has a half angle equal to or greater than 30 degrees and/or equal to or less than 87 degrees; and
    - the portion of the wall that is straight is arranged to receive light from at least a subset of the plurality of light sources.

2. The system of claim 1, wherein the half angle of the plurality of protrusions varies as a function of distance from a center of the lens.

3. The system of claim 2, wherein the function of distance from the center of the lens is a step function.

4. The system of claim 2, wherein the function of distance from the center of the lens varies smoothly.

5. The system of claim 1, wherein the protrusions, of the plurality of protrusions, have a center-to-center spacing in one dimension equal to or greater than 0.5 mm and equal to or less than 2 mm.

6. The system of claim 1, wherein the reflector has a height so that a minimum distance between the plurality of light sources and the lens is equal to or greater than 20 mm.

7. The system of claim 1, wherein:
- the optical surface is a first optical surface;
- the lens comprises a second optical surface opposite the first optical surface; and
- the lens comprises texturing on the second optical surface.

8. The system of claim 7, wherein the first optical surface is arranged to be closer to the plurality of light sources than the second optical surface.

9. The system of claim 7, wherein the second optical surface is arranged to be closer to the plurality of light sources than the first optical surface.

10. The system of claim 1, wherein the system comprises a film element arranged next to the lens to diffuse light from the lens.

11. The system of claim 1, wherein the plurality of light sources includes two or more different colors of light sources.

12. A method comprising:
- generating light from a plurality of light sources;
- transmitting light from the plurality of light sources towards a lens, wherein at least a portion of light from the plurality of light sources is reflected by a reflector to direct light towards the lens; and
- transmitting light through the lens, wherein:
  - the lens comprises a plurality of protrusions extending from an optical surface of the lens, the plurality of protrusions each defined by a base and an apex,
  - the apex is rounded;
  - at least a portion of a wall of the protrusion, between the base and the apex, is straight;
  - the wall that is straight creates a half angle in relation to the apex equal to or greater than 30 degrees and/or equal to or less than 87 degrees; and
  - the portion of the wall that is straight is arranged to receive light from at least a subset of the plurality of light sources.

13. The method of claim 12, wherein the plurality of protrusions are cones, and the portion of the wall of the protrusion that is straight is a slant of the cone.

14. The method of claim 12, wherein the half angle of the plurality of protrusions varies as a function of distance from a center of the lens.

15. A lens comprising:
- an optical surface; and
- a plurality of protrusions extending from the optical surface of the lens, the plurality of protrusions each defined by a base and an apex, wherein:
  - the apex is rounded; and
  - at least a portion of a wall of the protrusion, between the base and the apex, is straight;
  - a half angle, measured from the portion of the wall that is straight and in relation to the apex, of the plurality of protrusions varies as a function of distance from a center of the lens; and the portion of the wall that is straight is arranged to receive light from at least a subset of a plurality of light sources.

16. The lens of claim 15, wherein a length of the base of a protrusion is equal to or less than a center-to-center spacing of the protrusions.

17. The lens of claim 15, wherein the base of a protrusion touches a base of a neighboring protrusion.

18. The lens of claim 15, wherein a length of the base of a protrusion is equal to or greater than a center-to-center spacing of the protrusions so that there is overlap between protrusions.

19. The lens of claim 18, wherein the length of the base of the protrusion is equal to or greater than the center-to-center spacing of the protrusions so that there is no flat region between protrusions.

20. The lens of claim 15, wherein:

the optical surface is a first optical surface;

the lens comprises a second optical surface opposite the first optical surface; and the lens comprises texturing on the second optical surface.

* * * * *